UNITED STATES PATENT OFFICE.

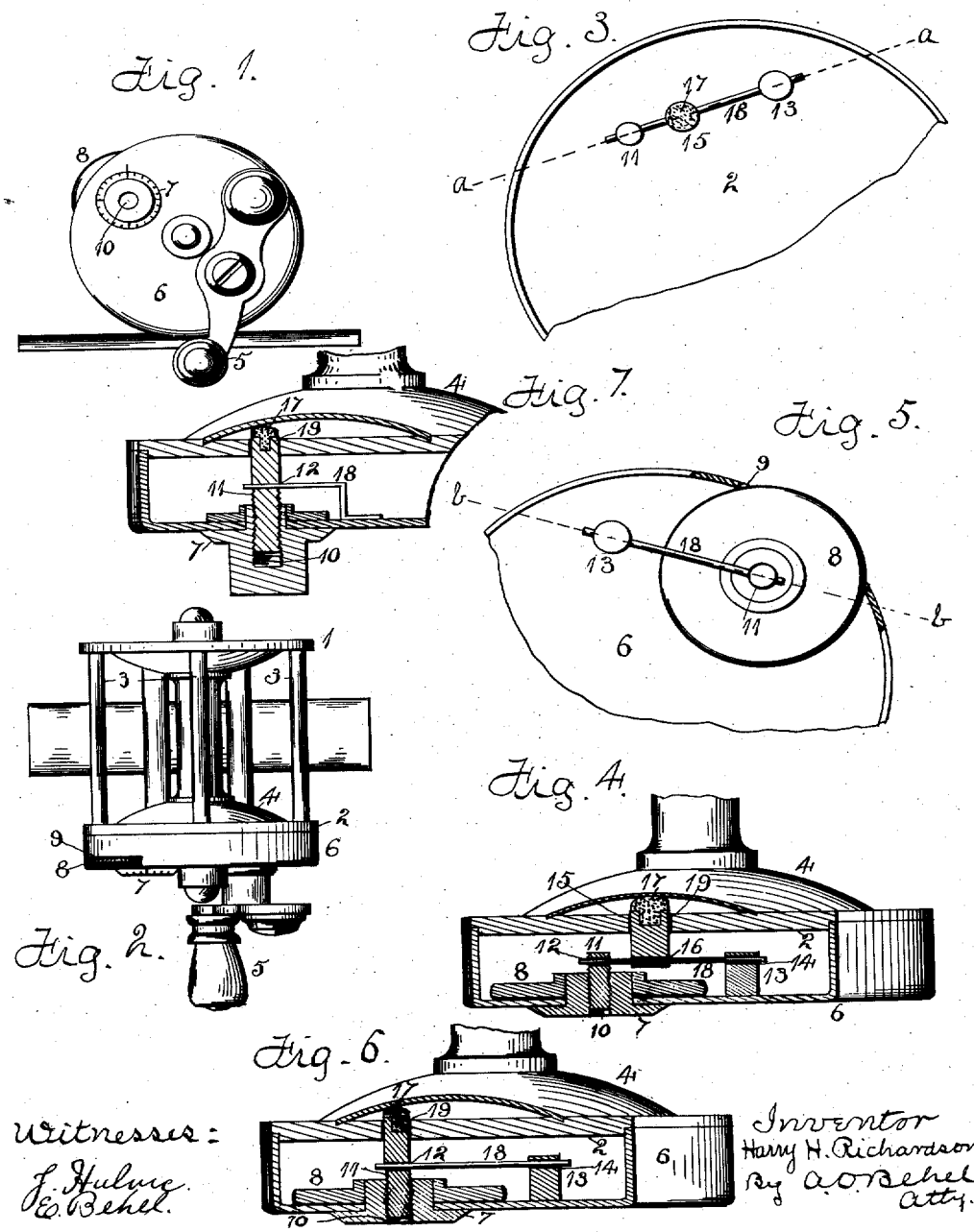

HARRY H. RICHARDSON, OF BEAVER FALLS, PENNSYLVANIA, ASSIGNOR TO AMERICAN COMPANY, OF ROCKFORD, ILLINOIS, A CORPORATION OF ILLINOIS.

FISH-LINE REEL.

No. 824,438.     Specification of Letters Patent.     Patented June 26, 1906.

Application filed February 23, 1905. Serial No. 246,986.

*To all whom it may concern:*

Be it known that I, HARRY H. RICHARDSON, a citizen of the United States, residing at Beaver Falls, in the county of Beaver and State of Pennsylvania, have invented certain new and useful Improvements in Fish-Line Reels, of which the following is a specification.

The object of this invention is to provide the reel with a micrometer-drag in order that the freedom with which the line may be cast may be regulated at will.

In the accompanying drawings, Figure 1 is an elevation of a reel with my improvements in connection therewith. Fig. 2 is a plan view. Fig. 3 is a face representation of some of the internal parts. Fig. 4 is a section on dotted line *a a*, Fig. 3. Fig. 5 is an inner-face representation of a modification. Fig. 6 is a section on dotted line *b b*, Fig. 5. Fig. 7 is a section of another modification.

The reel in the main is of an old construction. The heads 1 and 2 are connected by the rods 3. A spool 4 is supported by the heads. The handle 5 has the usual gear connection with the spool. The head 2 has a casing 6 connected to it and which supports the operative parts of the micrometer-drag. The casing supports a graduated disk 7 on its outer face, to which is connected a disk 8, located on the inner face of the casing and has a portion extending through an opening 9 in the casing to be engaged by the thumb of the operator. The hub portion of the dial has a screw-threaded opening 10. A screw 11 is located in the opening 10 and has a transverse hole 12 near its inner end. A stud 13 extends from the inner face of the casing and has a hole 14 near its inner end. A friction-brake 15 has a hole 16 near one end, and its other end supports a proper substance 17 for frictional contact. A rod 18 is located in the holes 12, 14, and 16 in the screw 11, stud 13, and brake 17, respectively, and the friction-brake extends through an opening 19 in the end 2 and may be forced in contact with the end of the spool.

As the screw 11 is held against rotation, it is evident that by turning the disk 8 in one direction the screw 11 will be forced inward, which will force the friction-brake against the inner face of the end of the spool and cause it to revolve with less freedom than if the friction were not applied. The degree of this friction engagement can be regulated to a nicety, and by observing the divisions on the dial with respect to the stationary mark on the casing the same frictional engagement can always be had after the spool has been allowed to run free.

Figs. 5, 6, and 7 show modifications in which the frictional brake supporting the material 17 is a continuation of the screw 11.

I claim as my invention—

1. A fish-line reel comprising two heads, a spool located between the heads and supported thereby, a screw supported by one of the heads, a connection between the head and screw whereby the screw is held against rotation, a friction-surface, and means for imparting a lengthwise movement to the screw to move the friction-surface and apply friction to the spool.

2. A fish-line reel comprising two heads, one of the heads having an opening, a spool located between the heads and supported thereby, a screw supported by one of the heads, a connection between the head and screw whereby the screw is held against rotation, a friction-surface and a disk located within one of the heads having a portion extending through the opening in the head and having an engagement with the screw by means of which a lengthwise movement is imparted to the screw to move the friction-surface and apply friction to the spool.

3. A fish-line reel comprising two heads, a spool supported by the heads, a movable disk, a screw having an engagement with the disk and provided with a transverse hole, a rod located in the hole and held stationary, a friction-surface, the movement of the disk imparting a lengthwise movement to the screw to move the friction-surface and apply frictional contact to the spool.

4. A fish-line reel comprising two heads, a spool supported by the heads, a rod, a stud, a screw held against rotation by the rod connected with the screw and also connected to the stud, a friction-surface and means for imparting a lengthwise movement to the screw to move the friction-surface and apply frictional contact to the spool.

5. A fish-line reel comprising two heads, a spool supported by the heads, a rotatable disk, a screw having an engagement with the disk, a frictional brake adapted to engage the spool, a rod having one end held stationary independent of the disk, means for connecting said rod with said screw and said brake.

6. A fish-line reel comprising two heads, a spool supported by the heads, a rotatable disk, a screw having an engagement with the disk and provided with a transverse hole, a frictional brake having a transverse hole, and a rod located in the transverse holes having one end held stationary independent of the disk, the frictional brake adapted to engage the spool.

7. A fish-line reel comprising two heads, a spool supported by the heads, a rotatable disk, a screw having an engagement with the disk and provided with a transverse hole, a stud supported by the casing and having a transverse hole, a frictional brake having a transverse hole, and a rod located in the three transverse holes, the frictional brake adapted to engage the spool.

HARRY H. RICHARDSON.

Witnesses:
ALEX. W. MOORE,
SUSIE W. ROUZER.

---

Correction in Letters Patent No. 824,438.

It is hereby certified that the name of the assignee in Letters Patent No. 824,438, granted June 26, 1906, upon the application of Harry H. Richardson, of Beaver Falls, Pennsylvania, for an improvement in "Fish-Line Reels," was erroneously written and printed "American Company," whereas the said name should have been written and printed *America Company;* and that the said Letters Patent should be read with this correction therein that the same may conform to the record of the case in the Patent Office.

Signed and sealed this 24th day of July, A. D., 1906.

[SEAL.]

F. I. ALLEN,
*Commissioner of Patents.* dependent of the disk, means for connecting said rod with said screw and said brake.

6. A fish-line reel comprising two heads, a spool supported by the heads, a rotatable disk, a screw having an engagement with the disk and provided with a transverse hole, a frictional brake having a transverse hole, and a rod located in the transverse holes having one end held stationary independent of the disk, the frictional brake adapted to engage the spool.

7. A fish-line reel comprising two heads, a spool supported by the heads, a rotatable disk, a screw having an engagement with the disk and provided with a transverse hole, a stud supported by the casing and having a transverse hole, a frictional brake having a transverse hole, and a rod located in the three transverse holes, the frictional brake adapted to engage the spool.

HARRY H. RICHARDSON.

Witnesses:
ALEX. W. MOORE,
SUSIE W. ROUZER.

---

Correction in Letters Patent No. 824,438.

It is hereby certified that the name of the assignee in Letters Patent No. 824,438, granted June 26, 1906, upon the application of Harry H. Richardson, of Beaver Falls, Pennsylvania, for an improvement in "Fish-Line Reels," was erroneously written and printed "American Company," whereas the said name should have been written and printed *America Company;* and that the said Letters Patent should be read with this correction therein that the same may conform to the record of the case in the Patent Office.

Signed and sealed this 24th day of July, A. D., 1906.

[SEAL.]

F. I. ALLEN,
*Commissioner of Patents.*

Correction in Letters Patent No. 824,438.

It is hereby certified that the name of the assignee in Letters Patent No. 824,438, granted June 26, 1906, upon the application of Harry H. Richardson, of Beaver Falls, Pennsylvania, for an improvement in "Fish-Line Reels," was erroneously written and printed "American Company," whereas the said name should have been written and printed *America Company;* and that the said Letters Patent should be read with this correction therein that the same may conform to the record of the case in the Patent Office.

Signed and sealed this 24th day of July, A. D., 1906.

[SEAL.]

F. I. ALLEN,
*Commissioner of Patents.*